US012352086B1

(12) United States Patent
McGregor et al.

(10) Patent No.: US 12,352,086 B1
(45) Date of Patent: Jul. 8, 2025

(54) RECESSED WALL ROLLER GUIDE FOR SLIDING DOORS

(71) Applicants: Aaron R. McGregor, Quilcene, WA (US); Dylan J. Warnberg, Victoria (CA); Matthew P. Komer, Port Townsend, WA (US)

(72) Inventors: Aaron R. McGregor, Quilcene, WA (US); Dylan J. Warnberg, Victoria (CA); Matthew P. Komer, Port Townsend, WA (US)

( * ) Notice: Subject to any disclaimer, the term of this patent is extended or adjusted under 35 U.S.C. 154(b) by 0 days.

(21) Appl. No.: 18/498,506

(22) Filed: Oct. 31, 2023

Related U.S. Application Data

(60) Provisional application No. 63/421,149, filed on Oct. 31, 2022.

(51) Int. Cl.
*E05D 15/06* (2006.01)

(52) U.S. Cl.
CPC .... *E05D 15/0656* (2013.01); *E05Y 2600/452* (2013.01); *E05Y 2900/14* (2013.01)

(58) Field of Classification Search
CPC ........... E05D 15/0656; E05Y 2600/452; E05Y 2900/14; E06B 3/46; E06B 3/4636; E06B 3/4654
USPC .............................................................. 16/91
See application file for complete search history.

(56) References Cited

U.S. PATENT DOCUMENTS 257,189 A * 5/1882 Scoville .............. E05D 15/0665 16/91
267,832 A * 11/1882 Brinkerhoff ........ E05D 15/0665 16/91
287,223 A * 10/1883 Brinkerhoff ........ E05D 15/0665 16/91
288,980 A * 11/1883 Cronk ................. E05D 15/0665 16/91
288,981 A * 11/1883 Cronk ................. E05D 15/0665 16/91
290,521 A * 12/1883 Brinkerhoff ........ E05D 15/0665 16/91

(Continued)

FOREIGN PATENT DOCUMENTS

KR 200438445 2/2008
KR 200489873 8/2019

(Continued)

OTHER PUBLICATIONS

Industrial Heavy-Duty Barn Door Floor Guide Roller, realcraft.com. https://realcraft.com/products/industrial-heavy-duty-floor-mount-stay-roller?utm_term=&utm_campaign=&utm_source=adwords&utm_medium=ppc&hsa_acc=9785771408&hsa_cam=15454387380&hsa_grp=&hsa_ad=&hsa_src=x&hsa_tgt=&hsa_kw=&hsa_mt=&hsa_net=adwords&hsa_ver=3&gclid=Cj0KCQjw3eeXBhD7ARIsAHjssr-3LeZxjK4sEspig2d0OHoZIfDW17TrsPAHLsS5w8bfCIUp2MrilocaAiT0EALw_wcB&variant=32527485829216 [Date accessed: Aug. 16, 2022].

(Continued)

*Primary Examiner* — William L Miller
(74) *Attorney, Agent, or Firm* — Bold IP, PLLC; Christopher Mayle

(57) ABSTRACT

A system and method for one or more insert door guiding systems which are a unique assembly of parts that allow a guide wheel to be inset into an adjacent material allowing a relatively large diameter wheel and a low clearance between the door or panel and the adjacent wall or material concurrently, whereby the insert door guiding systems include a shell or cup, a roller and roller pin, a bearing and bushing, roller spaces, and a tire.

6 Claims, 5 Drawing Sheets

(56) References Cited

U.S. PATENT DOCUMENTS

| | | | | | |
|---|---|---|---|---|---|
| 295,345 | A | * | 3/1884 | Brinkerhoff | E05D 15/0665 16/91 |
| 297,805 | A | * | 4/1884 | Ide | E05D 15/0665 16/91 |
| 298,914 | A | * | 4/1884 | Terry | E05D 15/0665 16/91 |
| 302,824 | A | * | 7/1884 | Brinkerhoff | E05D 15/0665 49/410 |
| 307,131 | A | * | 10/1884 | Mattoon | E05D 15/0665 16/91 |
| 308,177 | A | * | 11/1884 | Laass | E05D 15/0665 16/91 |
| 313,085 | A | * | 3/1885 | Lawrence | E05D 15/0665 16/91 |
| 319,938 | A | * | 6/1885 | Swett | E05D 15/0665 49/410 |
| 341,640 | A | * | 5/1886 | Coleman | E05D 15/0656 16/91 |
| 350,751 | A | * | 10/1886 | Lane | E05D 15/0665 16/91 |
| 472,110 | A | * | 4/1892 | Eckerson | E05D 15/0665 16/91 |
| 842,009 | A | | 1/1907 | Record | |
| 873,816 | A | * | 12/1907 | Wideman | E05F 1/006 16/91 |
| 988,880 | A | * | 4/1911 | Klotz | E05D 15/063 16/91 |
| 1,467,826 | A | | 9/1923 | Burnbarger | |
| 2,939,167 | A | * | 6/1960 | Preston | E05D 15/0656 16/90 |
| 3,000,046 | A | * | 9/1961 | Foltz | E05D 15/0656 16/90 |
| 3,118,169 | A | * | 1/1964 | Foltz | E05D 15/0656 16/90 |
| 3,276,068 | A | * | 10/1966 | Milette | E05D 15/0656 16/90 |
| 4,672,712 | A | * | 6/1987 | Stevenson | E05D 15/0656 16/91 |
| 4,722,150 | A | * | 2/1988 | Jacobs | E05D 15/0665 16/98 |
| 5,855,041 | A | * | 1/1999 | McMichael | E05D 15/0656 16/91 |
| 6,422,152 | B1 | | 7/2002 | Rowe | |
| 6,938,375 | B2 | | 9/2005 | Duncan et al. | |
| 7,647,729 | B2 | | 1/2010 | Polus | |
| 7,849,560 | B2 | | 12/2010 | Kelley | |
| 8,375,638 | B2 | | 2/2013 | Martin et al. | |
| D695,593 | S | | 12/2013 | Farfan | |
| 10,988,971 | B1 | | 4/2021 | Annazone, Jr. et al. | |
| 2019/0277080 | A1 | * | 9/2019 | Frankel | E06B 3/4654 |
| 2019/0357733 | A1 | * | 11/2019 | Romero | A47K 3/34 |

FOREIGN PATENT DOCUMENTS

| | | | | |
|---|---|---|---|---|
| KR | 20210121692 | A | | 10/2021 |
| KR | 200497833 | Y1 | * | 3/2024 |

OTHER PUBLICATIONS

Prime-Line Closet Door Roller: Sliding Door, Nylon, Unfinished, 3 53/64 in Lg (In.), Steel, 1, 1 PR, grainger.com. https://www.grainger.com/product/430V86?gucid=N:N:PS:Paid:GGL:CSM-2295:4P7A1P:20501231&gclid=Cj0KCQjw3eeXBhD7ARIsAHjssr9EewgsLaq0JYKOz7rtnpljtEUz_i9pOcPAGmNSgxSIZZJtlYUSZEaAiM9EALw_wcB&gclsrc=aw.ds [Date accessed: Aug. 16, 2022].

* cited by examiner

RECESSED WALL ROLLER GUIDE FOR SLIDING DOORS

CROSS REFERENCE TO RELATED APPLICATIONS

This application claims priority to U.S. Provisional Patent Application 63/421,149 filed on Oct. 31, 2022, and is incorporated in its entirety.

FIELD OF DISCLOSURE

The overall field of invention is directed to a guide device for a sliding door, and more particularly, it relates to a guide device for a door, which can minimize fluctuation or noise during opening or closing of the pocket door or surface mounted sliding door and is recessed into the adjacent material.

BACKGROUND

A door guide is a hardware piece installed for a sliding door to keep it in place and prevent wobbling when opening or closing. There are multiple floor guide designs on the market. They can be mounted on the floor or wall and can be visible, partially visible, or completely hidden. They are also available in multiple shapes, materials, and finishes, but they all have the same purpose: keep your door in place. Most current systems do not recess the roller into the wall and thus either use a smaller diameter roller or force a larger clearance from the door to the wall or adjacent material. The existing systems also use a high density hard plastic roller and are noisy as compared to our invention that uses a soft rubber tire over a bearing or bronze bushing. Ones that recess are not compact enough to fit into the edge of a door casing of ¾". Thus exists the need for a new system that recesses the roller into the adjacent material or wall allowing a larger diameter roller to be between the door with minimal clearance whereby the roller is made of a material similar to a soft tire for silent contact to the door.

SUMMARY

The present invention is directed to a system and method for one or more insert door guiding systems which are a unique assembly of parts that allow a guide wheel to be inset into an adjacent material allowing a relatively large diameter wheel and a low clearance between the door or panel and the adjacent wall or material concurrently. This concept can be scaled to any useful size and version. The present invention provides at least three versions including the insert guide, pocket guide, and magnetic guide. These three versions share five parts including a shell or cup, a roller and roller pin, a bearing and bushing, roller spaces, and a tire. The three versions have variations for attachment and adjustment that include screws, threads, shims, and O-rings to provide various advantages in different situations.

As will be described in more detail below with reference to figures, insert door guiding systems may be provided on both sides of the inside of a pocket positioned between a pair of pocket door jamb casings which are situated inside of outer trim so that a pocket door positioned inside of the pocket may be moved between and along the insert door guiding systems on both sides.

BRIEF DESCRIPTIONS OF DRAWINGS

The present invention will be described by way of exemplary embodiments, but not limitations, illustrated in the accompanying drawings in which like references denote similar elements, and in which.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
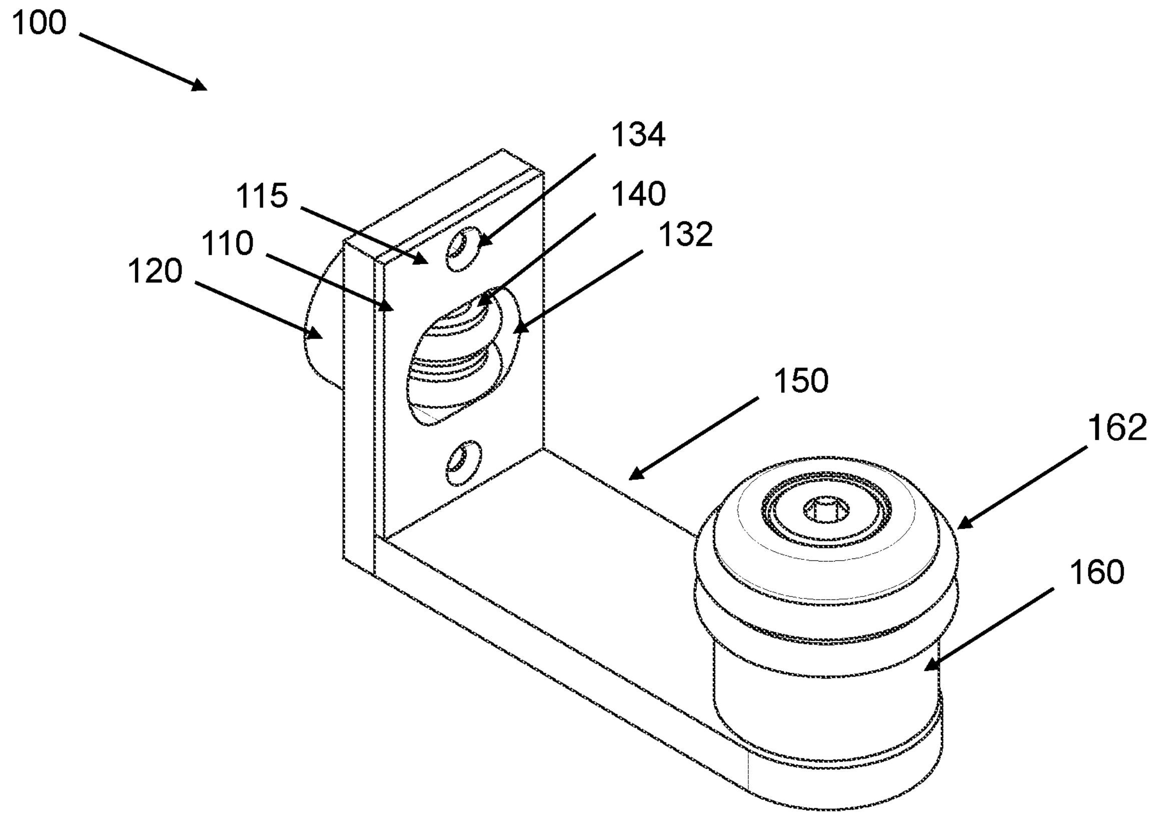
FIG. 1 shows an illustration of a first embodiment of the roller guider system.
Figure 2:
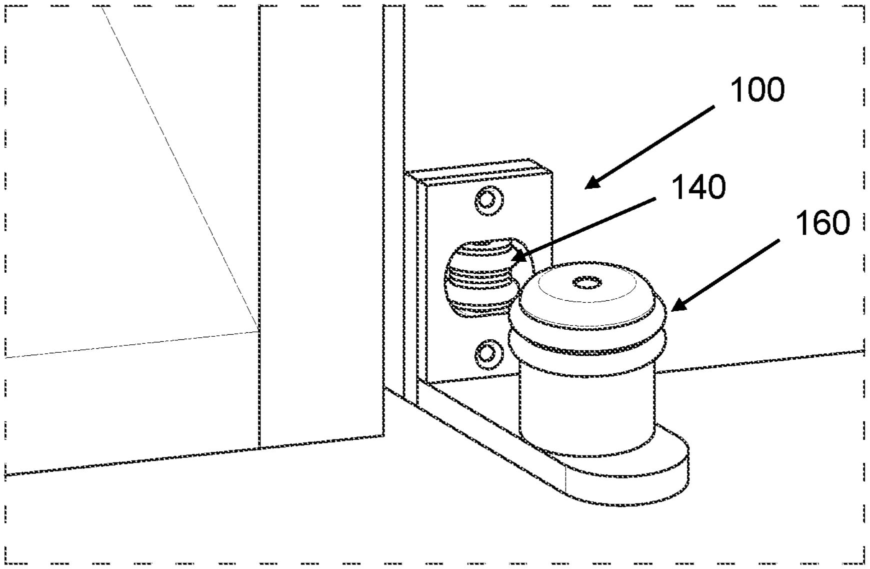
FIG. 2 shows an illustration of the first embodiment in a surrounding environment.

FIG. 1 shows an example perspective view of a first embodiment of a door guiding system 100 in accordance with the present invention. Door guiding system 100 may have a shell 110 acting as a case component designed to retain rollers 140 and protect roller 140 while permitting the mounting of rollers 140 within the interior of shell 110. When installed, shell 110 may be inserted into a pre-drilled or otherwise formed hole in the pocket door jamb casing, screwed into the predrilled hole, or fastened to the face of the framing or trim casing or surface.

Figure 6A:
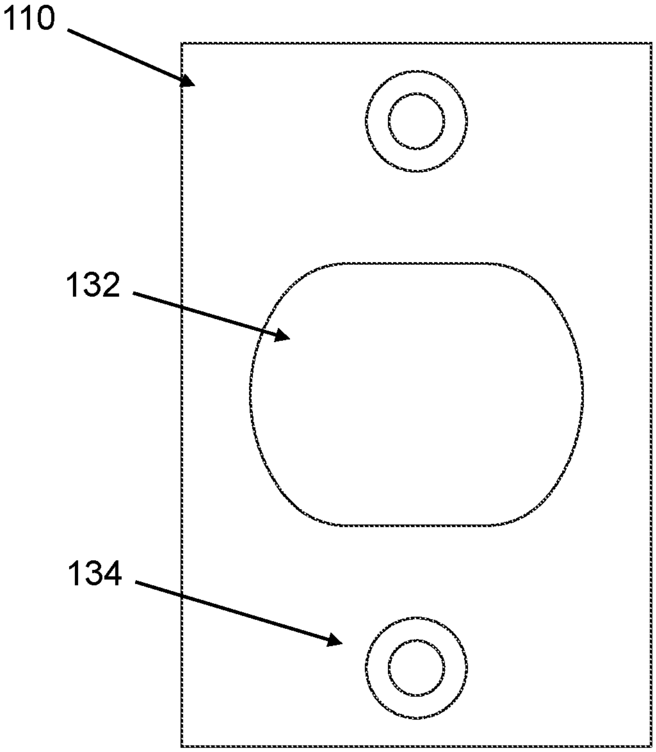
FIG. 6A shows a front view of a faceplate of the roller guider system.
Figure 6B:
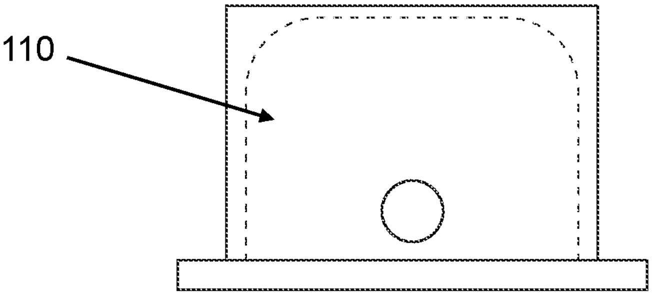
FIG. 6B shows a top view of the faceplate of the roller guider system.

Shell 110 may have a rectangular plate portion 115 with an aperture 134 near a top of rectangular plate portion 115 and a second aperture 134 near a bottom of rectangular plate portion 115 to connect rectangular plate portion 115 to the wall, as illustrated in FIG. 6A. However, this is non-limiting and may be any shape. Between apertures 134 may be a third larger aperture 132 that is discorectangle in shape, which is the perfect shape for facilitation of rollers with enough clearance on either side. Third aperture 132 may extend rearward into a discorectangle shaped recess 120 designed for housing the rollers as illustrated in FIG. 6B. During operation, recess 120 would be positioned into the pocket door jamb casing or adjacent material while first and second aperture 134 may receive one or more fasteners to secure insert door guiding system 100 to the pocket door jamb casings.

Figure 6C:
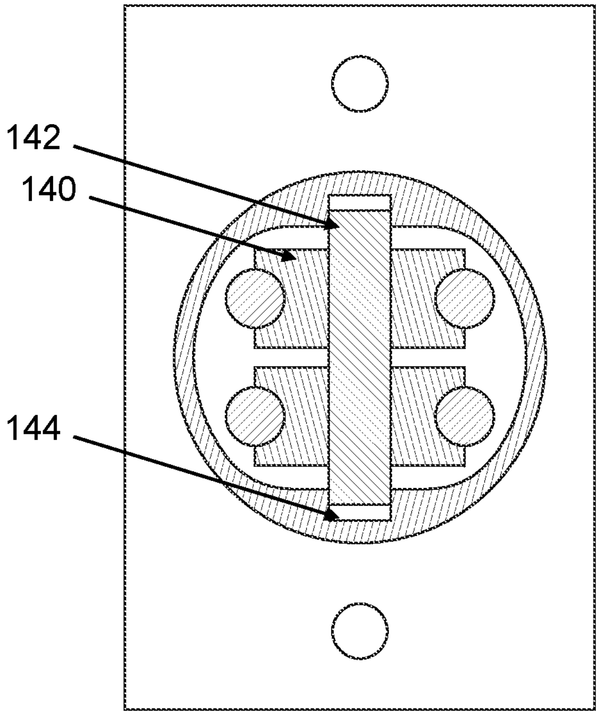
FIG. 6C shows a front view of the rollers of the roller guider system.
Figure 6D:
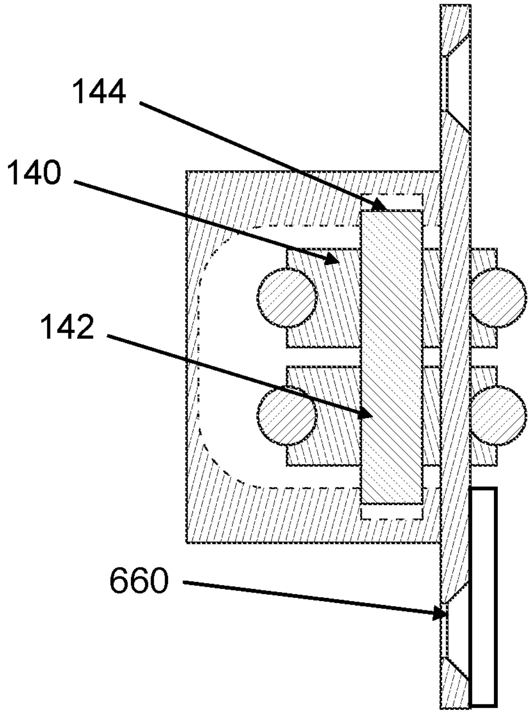
FIG. 6D shows a side view of the rollers of the roller guider system.

Rollers 140, as illustrated in FIG. 6C-6D, may be installed in the shell such that the roller may be rotated by the external force in place. Rollers 140 may have an outer tire designed to be the actual spinning element that the door comes into contact with. The outer tire makes up the soft part of rollers 140 that allows for quiet rolling against a door or surface. The outer tire may fit around a bearing and bushing to give a bigger surface to spin the bearing such that the bearing and the tire spin in unison. The tire may be hollow with a cylindrical shape. However, this is non-limiting and other shapes may be used such as a sphere or any shaped prism such as a rectangular cross section.

The bearing and bushing are the core of rollers 140 and allow smooth rotation of the roller assembly while designed to carry a load and minimize friction. The bearing may be a standard commercially available metal bearing adapted to have an inner race rotatable relative to an outer race. The bearing may have a central circular recess aligned such that the axel may be passed through the shell and bearing and be secured within the shell.

Figure 7A:
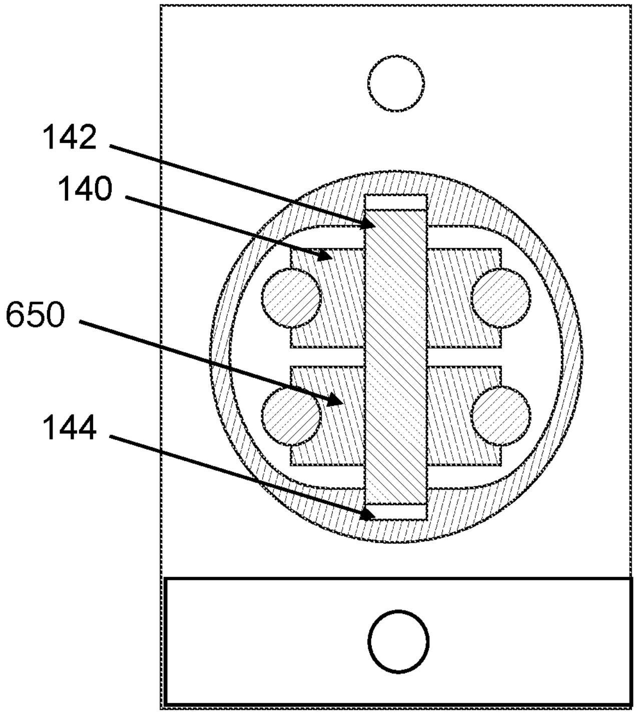
FIG. 7A shows a front view of the magnetic roller guider system.
Figure 7B:
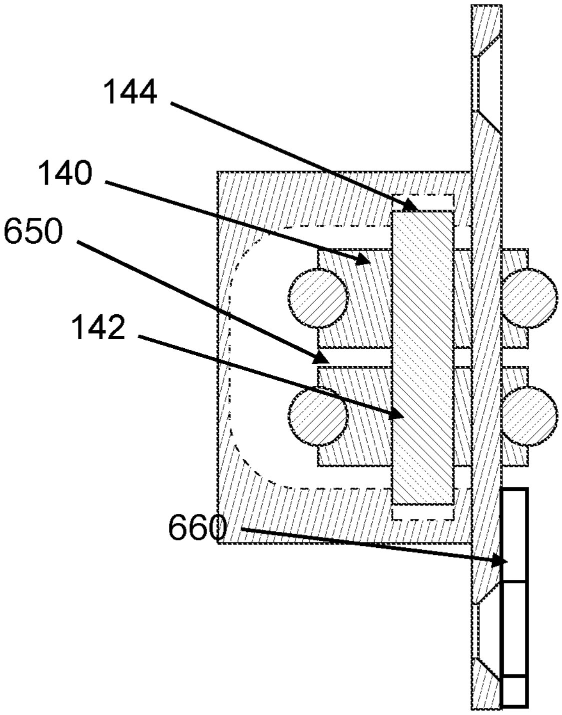
FIG. 7B shows a side view of the magnetic roller guider system.

In some embodiments as illustrated in FIG. 7, shell 110 may also house a magnetic roller 650 or fixed magnet to engage a steel bar mounted on the door to keep the door engaged with the roller and secured along the wall. In this embodiment, shell 110 may be magnetic or have an attached magnetic plate 660. The magnetic version would facilitate the elimination of the outer guide for the guide system to be completely hidden. The magnet would be sized to allow a specific poundage of force resistance against the door.

At the top surface and bottom surface of recess 120 in shell 110 may be a hole 144 that extends through to receive an axel 142 connected to the rollers such that axel 142 may be secured inside recess 120. Recess 120 then acts as a cavity for the bearing such that bearing may be pressed into and secured within the circular recess. One or more spacer bushings may be used to center rollers 140 in shell 110. One or more shims may be used for the insert, pocket, and magnetic variations to allow door or panel offset adjustment. The insert, pocket, and magnetic variations may use two screws through the body and shims to attach to the surface.

Figure 3:
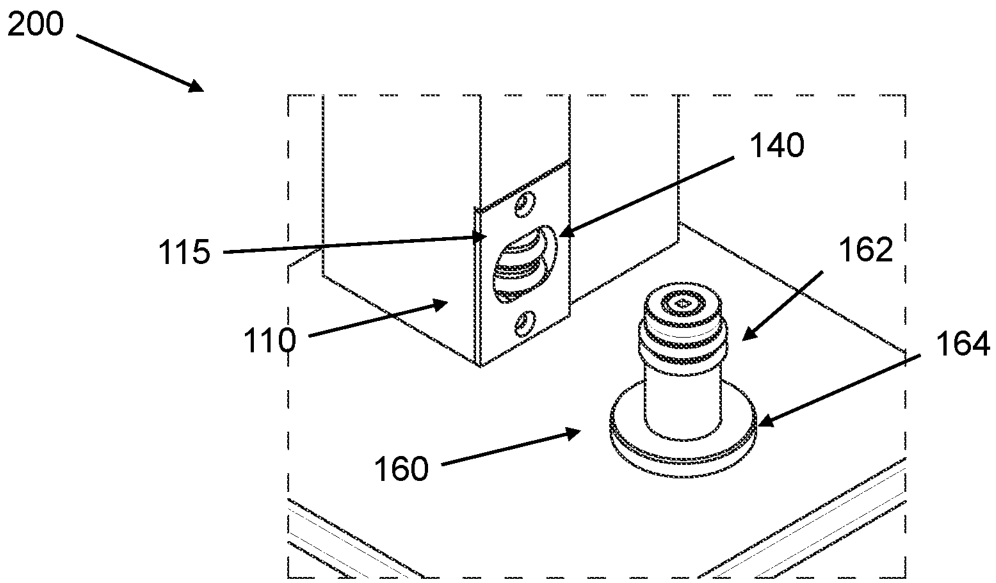
FIG. 3 shows an illustration of a second embodiment of the roller guider system.
Figure 4:
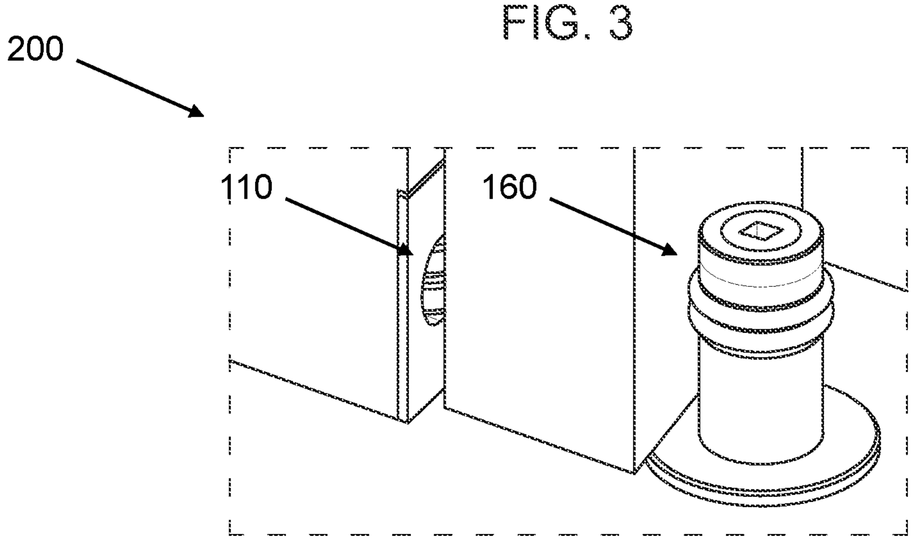
FIG. 4 shows an illustration of the second embodiment in a surrounding environment.
Figure 5:
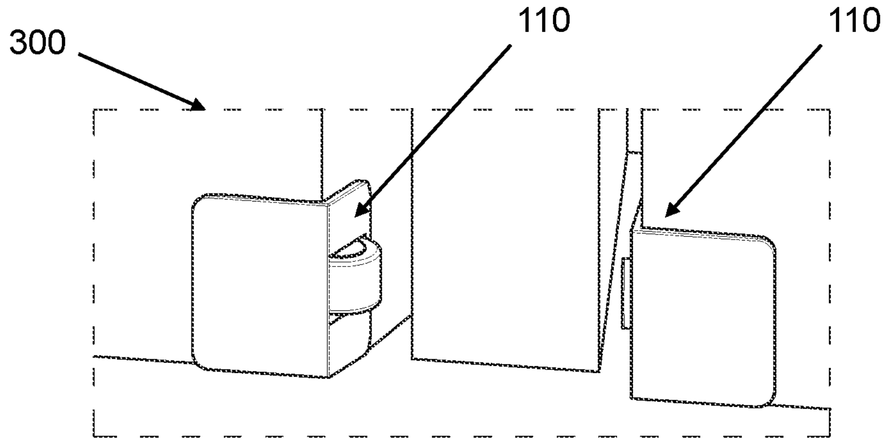
FIG. 5 shows an illustration of a third embodiment of the roller guider system.

In one or more non-limiting embodiments, the insert door guiding system may have an adjustable wall mount or floor mount connected to the shell for guiding a door without the need for a second pocket door jamb casing. As illustrated in FIG. 1, the wall mount may have a first component 150 that extends outward horizontally from a bottom or near a bottom of the shell 110 whereby first component 150 is parallel with the ground. First component 150 may extend upward into a second component 160 at an end opposite of the end connected to shell 110. Second component 160 may be a cylinder positioned vertically whereby second component 160 may have one or more tires 162 or O-rings to facilitate guidance of the pocket door. As illustrated in FIG. 3 and FIG. 4, a second door guiding system 200, is illustrated whereby second component 160 may be separated completely from shell 110 and placed a predetermined distance apart. As illustrated in FIG. 5, a third door guiding system 300, is illustrated whereby a first and/or second shell 110 are placed in opposing walls to receive a sliding door.

The three embodiments of the insert door guide, the insert, pocket, and magnetic variations are hybrids of the inventive concept. There may be additional embodiments including a fully threaded shell that can be threaded into the retaining material or have an additional outer shell that allows mounting and then an inner shell which thread and adjust laterally for clearance adjustment. The shell can be mounted using more fasteners. The insert door guiding systems may be used in any orientation to allow smooth, low friction, directional rolling between two adjacent materials or objects. The insert door guiding systems may be created at any usable scale using the appropriate parts and materials to generate the same function at that particular scale.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A door guiding system: comprising a roller system positioned inside of a shell and protruding through an aperture on the shell, wherein the shell is recessed into a wall, wherein one or more rollers of the roller system are permitted to rotate within an interior of the shell, wherein the one or more rollers have an outer tire, wherein the shell is recessed at a corner of the wall, wherein the tire has a larger diameter than height, wherein the shell has a flat plate portion positioned flush or outside and against the wall to fasten the door guiding system to the wall, wherein the shell is rearward of the flat plate portion and is a cylinder, wherein an axis of the cylinder is orientated parallel to the flat plate portion.

2. The door guiding system of claim 1, wherein the plate portion has an upper aperture near a top of the plate portion and a lower aperture near a bottom of the plate portion for receiving a fastener to connect the plate portion to the wall.

3. The door guiding system of claim 1, wherein the roller system is rollers connected by an axel that extends to a top and bottom of the interior.

4. The door guiding system of claim 3, wherein the axel is received by a recess at the top and the bottom of the interior.

5. The door guiding system of claim 1, wherein the shell retains a magnet.

6. The door guiding system of claim 1, wherein the aperture is discorectangle in shape, wherein the aperture is wider than the aperture is tall.

* * * * *